May 8, 1956   A. W. GARDES   2,744,632
FILTERING SCREEN ASSEMBLY
Filed Dec. 23, 1950   2 Sheets-Sheet 1

Inventor
Alfred W. Gardes

May 8, 1956  A. W. GARDES  2,744,632
FILTERING SCREEN ASSEMBLY
Filed Dec. 23, 1950  2 Sheets-Sheet 2

Inventor
Alfred W. Gardes

United States Patent Office 2,744,632
Patented May 8, 1956

2,744,632
FILTERING SCREEN ASSEMBLY

Alfred W. Gardes, Detroit, Mich., assignor to Indiana Commercial Filters Corporation, a corporation of Indiana Application December 23, 1950, Serial No. 202,537

7 Claims. (Cl. 210—184)

This invention relates to improvements in a filtering screen assembly, and more particularly to a filtering screen or screen assembly of the character highly desirable for use in both low and high capacity clarifiers for coolants, oils, and various other substances requiring filtration, although the screen assembly may have other uses and purposes as will be apparent to one skilled in the art.

In the past, a number of filtering devices have been developed utilizing tubular screens to perform the filtering operation. Where such devices have been used for the filtration or clarification of coolants used with cutting and grinding machines, by way of example, a device has been provided embodying a housing or tank inside which one or more tubular screens are provided. The filtrable fluid is pumped into the tank under pressure, passes laterally through the vertically disposed screens, and the filtrate exits through an open end of each screen. At periodic intervals the entering filtrable material is cut off, and pressure is applied to the filtrate inside the tank, forcing this filtrate in a reverse direction through the tubular filter elements or assemblies to cleanse them of the accumulations on the outer surfaces thereof. In many cases in order to acquire the desired capacity, screen assemblies of considerable length, in excess of four feet for example, were utilized. In most instances, upon the reverse pressure to effect cleansing of the screens, commonly called blowback, the screens would be cleansed only in the upper portion of their length, and the remaining liquid bypassed in that portion with the lower parts of the screens carrying their accumulations. In many cases it has been found that a screen will properly cleanse on blowback to a distance of thirty inches from the outlet end. Consequently, after relatively short usage, only a portion of each screen is performing its work.

With the foregoing in mind, it is an important object of the instant invention to provide a screen assembly of the character set forth herein which will be effectively and thoroughly cleansed throughout its entire length upon blowback or a reverse pressure operation.

Another object of this invention resides in the provision of a filtering screen assembly, embodying a relatively long tubular screen filter, constructed to effect a complete cleansing of the screen surface upon a reverse pressure action or blowback, and which may be constructed substantially as economical as screen assemblies heretofore used that could not be so cleansed.

A further feature of this invention resides in the production of an elongated tubular filter screen assembly, in which the tubular filter portion is transversely divided substantially centrally thereof, and separate outlets for the filtrate are provided from such separated filtering portions.

A further feature of the invention resides in the provision of a filtering screen assembly, unitary in character, which embodies a pair of aligned tubular filtering portions separated by a transverse plate, the entire structure being held together by end plates and a pipe connecting said end plates passing axially through both tubular filtering portions and the plate, the pipe being perforated on one side the plate and imperforate on the other.

It is also an object of this invention to provide a simply constructed and highly economical filter screen assembly which may, as a unit, be readily mounted in position, and which embodies separated filtering portions.

While some of the more salient features, characteristics and advantages of the instant invention have been above pointed out, others will become apparent from the following disclosures, taken in conjunction with the accompanying drawings, in which—

Figure 1:
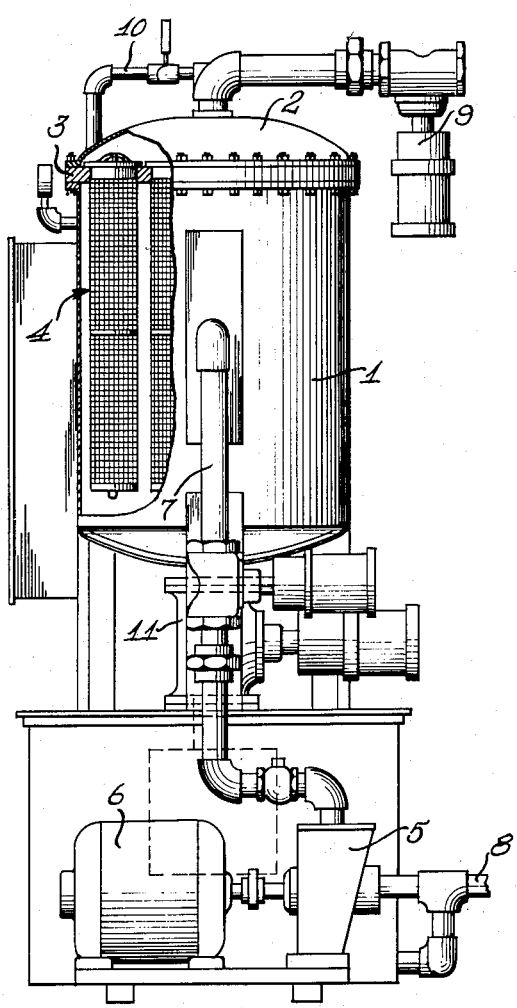
Figure 1 is a fragmentary side elevational view of a clarifying apparatus, with parts broken away, to illustrate the use of filtering screen assemblies embodying principles of the instant invention.

The illustrated embodiment of the instant invention is shown in operative association in a clarifier of the type utilized to cleanse or filter coolants for grinding machines. The clarifier embodies a housing or tank 1 having a cover 2 thereon, and between the tank and cover a screen supporting plate 3 is firmly held in position. From this plate a series of screens or screen assemblies depend, these being generally indicated by numeral 4 in Fig. 1. Contaminated coolant under pressure is pumped into the tank by a pump 5, driven by any suitable power unit such as a motor 6, through an intake pipe 7. The fluid comes to the pump through a pipe 8 connected with a tank (not shown in the drawings) in which the dirty coolant is collected. Cleaned coolant exits through the top of the structure from the space beneath the cover 2 through a pipe 9 to be returned to the grinding machines.

In cleansing, the coolant passes laterally or radially through the tubular screen assemblies, and the filtrate exits through the top of the assembly to pass out the pipe 9. Periodically, it is necessary to cleanse the filter assemblies and this is done at predetermined intervals either by means of a timing arrangement, or by means of a pressure arrangement functioning when the pressure inside the tank increases to a certain extent by virtue of the accumulation on the outer surfaces of the screen assemblies. By suitable controls, not illustrated, pneumatic pressure is applied through the pipe 10 into the cover 2 through the same orifice that fluid exits through the pipe 9. This pressure blows back the filtrate above the screen holding plate 3 reversely through the filter screen assemblies, the intake through the pipe 7 having been cut off at the proper time. Consequently the external surface of the screen is cleansed by the reverse flow of filtrate therethrough, and the entire contents of the tank is then discharged through a blowdown pipe 11 into a blowdown tank which communicates with the tank of contaminated coolant to be in turn pumped back through the pipe 8 and again into the clarifier.

As stated above, in some assemblies screens over four feet in length were utilized, and upon the blowback or blowdown operation, the upper portions of said screens, say to thirty inches, would be cleansed, but the accumulation on the lower portions of the screen would not be effectively removed owing to the previous cleansing of the upper portions.

Figure 2:
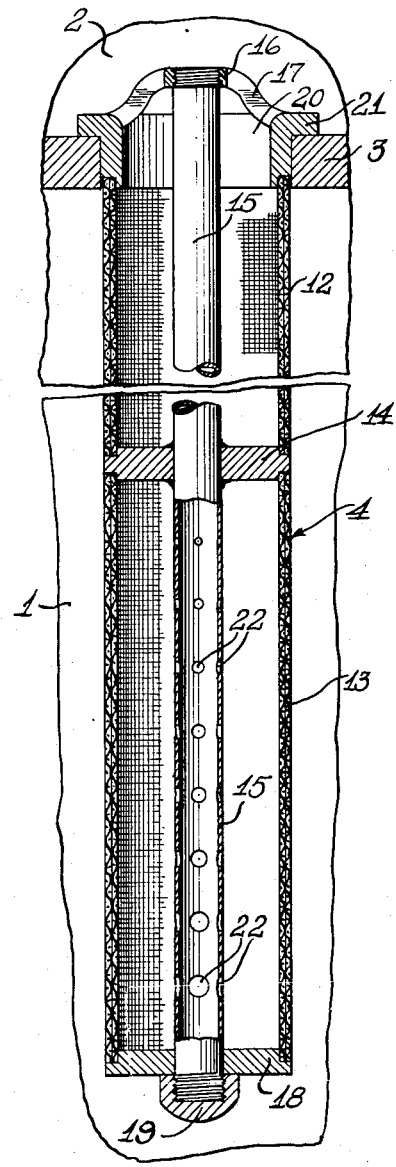
Figure 2 is an enlarged fragmentary central vertical sectional view through one of the filtering screen assemblies, with certain parts shown in elevation for purposes of clarity.

The instant invention effectively overcomes any such difficulty. With reference more particularly to Fig. 2 it will be seen that the screen assembly includes a pair of axially aligned superposed tubular screens 12 and 13, both identical. One satisfactory form of screen material is Dutch weave wire cloth, of Monel metal or some other rust resistant material. The filtering efficiency of the screen increases as particles removed from the contaminated fluid accumulate on the screen surface between blowback periods. Thus, extremely fine particles may readily be filtered from the coolant or other fluid.

With the construction illustrated in Fig. 2, the upper screen 12 is preferably thirty inches or less in length, while the lower screen, usually of the same length as the upper for economic manufacturing purposes, may be longer if so desired. Between the confronting ends of the screens 12 and 13 is a double faced seating flange 14 which completely separates the screens interiorly. Fixedly secured to this flange and passing therethrough is a pipe 15 which is secured to the central ring 16 of a spider 17 at its upper end, beyond the end of the screen 12. At the lower end of the structure, the pipe extends through a cap 18 to which it may be secured either by threaded engagement or by a pipe cap 19 as illustrated. Of course, the lower cap 18 is faced on its inner side to function as a seating flange for the screen 13.

The aforesaid spider 17 is provided with a tubular portion 20 that extends through the screen holding plate 3, and the lower edge of this portion is faced to provide a flange seat for the upper end of the screen 12. Above the cylindrical or tubular portion 20 the spider is provided with an outwardly extending flange 21 which rests on top of the screen holding plate 3 and from which the entire screen assembly is suspended. If it is deemed desirable to hold the flange 21 tightly down against the screen holding plate 3, any suitable means for that purpose may be provided.

Figure 3:
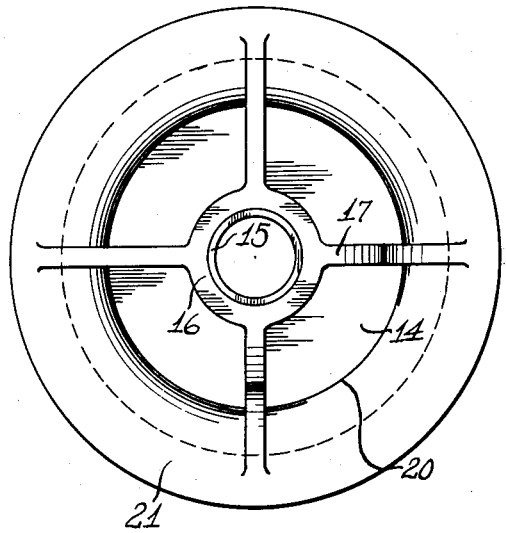
Figure 3 is an enlarged top plan view of the screen assembly of Fig. 2, taken alone.
Figure 4:
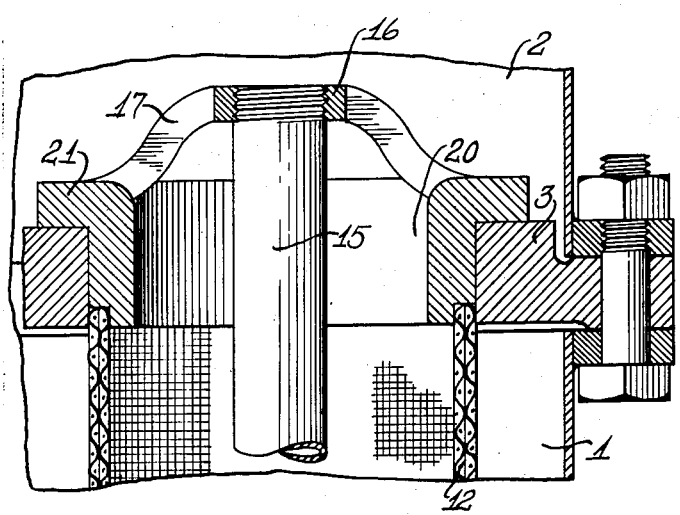
Figure 4 is an enlarged vertical sectional view, fragmentary in character and showing parts in elevation, taken in the same location as the upper portion of Fig. 2.

Figs. 3 and 4 illustrate in an enlarged manner the construction of the spider 17 and its association with the screen holding plate 3.

It will be especially noted that the upper portion of the pipe 15 is imperforate, but below the seating flange 14 secured to that pipe, the pipe is perforated with a series of perforations 22 gradually increasing in size downwardly or toward the far end of the screen 13.

In operation, filtrable fluid under pressure inside the tank 1 will pass laterally through both the screens 12 and 13. The filtrate from the screen 12 will exit upwardly into the space beneath the cover 2 through the spaces between the arms of the spider 17 around the pipe 15, while the filtrate from the screen 13 will enter the apertures 22 in the lower portion of the pipe, and exit through the upper open end of the pipe. Thus, both screens are provided with separate exits for the respective filtrates. Upon blowback, fluid from beneath the cover 2 will be discharged downwardly both between the arms of the spider into the screen 12 and through the open upper end of the pipe 15 and the apertures in the lower portion thereof into the screen 13. The upper screen is preferably sufficiently short and it will be thoroughly cleansed upon that blowback operation, while the graduated apertures in the lower part of the pipe effect a proper distribution of the blowback fluid so that this screen is also entirely cleansed.

At this point it should be noted that if a screen assembly slightly longer than that which may be effectively cleansed on blowback of the type known heretofore is used, the lower screen 13 might be used alone of the required length, a perforated pipe being employed, and the double face seating flange 14 and upper imperforate portion of the pipe eliminated. The graduated perforations would effect a proper distribution of the filtrate to insure a full cleansing of such a screen. In long assemblies, however, it is more desirable to use the screen assembly as illustrated with both screens 12 and 13 therein.

Figure 5:
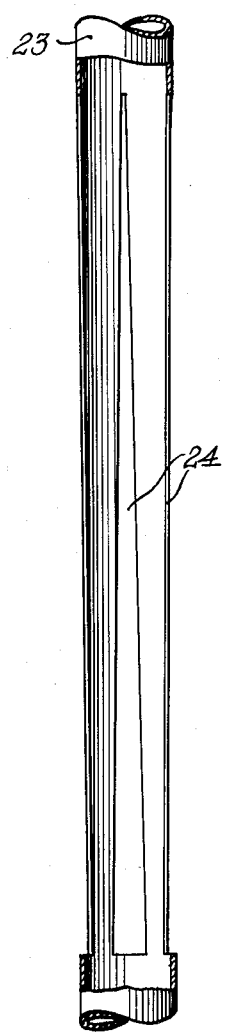
Figure 5 is a fragmentary vertical sectional view showing an interior type of the screen assembly of somewhat different form.

In Fig. 5 I have illustrated a slightly different form of center pipe for the screen assembly. In this instance, a pipe 23 is illustrated which functions the same as the aforesaid pipe 15. The upper portion of the pipe 23 is imperforate, while the lower portion is provided with one or more elongated slots 24 which gradually increase in width toward the lower end of the pipe. Such a pipe will also effect a proper distribution of filtrate in reverse direction through the lower screen 13 to insure complete cleasing of that screen.

From the foregoing, it is apparent that I have provided a novel, economical, and highly durable screen assembly for clarifiers and other apparatus wherein filter screens are employed. The structure is simple to manufacture, simple to assemble, simple to install, and may be readily removed or replaced after usage.

It will be understood that modifications and variations may be effected without departing from the scope of the novel concepts of the present invention.

I claim as my invention:

1. In a filter screen assembly, a pair of tubular filter screens in axial alignment, a pipe extending through both said screens with its outer end closed, means connecting said pipe to the outer ends of the screens, means carried by said pipe imperforate except for said pipe extending therethrough and separating and sealing off the adjacent ends of said screens from each other, and said pipe being imperforate inside the screen farthest from the closed pipe end and perforate inside the other, the first said means having an opening therein at one end to form an outlet for filtrate from the screen around the imperforate pipe portion.

2. In a filter screen assembly, a pair of tubular filter screens in axial alignment, a pipe extending through both said screens, means connecting said pipe to the outer ends of the screens, one of said means being perforate around the end of said pipe, means carried by said pipe imperforate except for the pipe passing therethrough separating and sealing off adjacent ends of said screens from each other, means closing one end of said pipe, and said pipe being perforated inside the screen adjacent the closed end of the pipe and imperforate inside the other screen, said one of the first said means providing a filtrate outlet from the screen around the imperforate part of said pipe.

3. In a filter screen assembly, a pipe, a double-faced flange seat secured to said pipe in an intermediate location and imperforate except for the pipe passing therethrough, a pair of tubular screens around said pipe with adjacent ends seated against opposite sides of said flange seat and sealed off thereby, closure means for the other end of one screen and the adjacent pipe end, a spider having a seat for the free end of the other screen and providing a filtrate outlet for that screen, the open end of said pipe being secured to the center of said spider, and that portion of said pipe between said flange seat and said closure means being perforated.

4. In a filter screen assembly, a pipe, a double-faced flange seat secured to said pipe in an intermediate location and being imperforate except for the pipe passing therethrough, a pair of tubular screens around said pipe with adjacent ends seated against opposite sides of said flange seat and sealed off thereby, closure means for the other end of one screen and the adjacent pipe end, a spider having a seat for the free end of the other screen and providing a filtrate outlet for that screen, the open end of said pipe being secured to the center of said spider, that portion of said pipe between said flange seat and said closure means being perforated, and outwardly extending flange means on said spider from which the entire assembly may be suspended.

5. In a filter screen assembly, a pair of axially aligned tubular screens, a pipe extending through said screens, imperforate means carried by said pipe therearound separating and sealing off the adjacent ends of said screens around the pipe, means closing an end of one screen and the adjacent pipe end, and said pipe being perforated between the first and second said means whereby filtrate from one screen passes through said pipe and from the other screen around said pipe.

6. In a filter screen assembly, a pipe, an imperforate double-faced flange seat secured around and to said pipe in an intermediate location, a pair of tubular screens around said pipe with adjacent ends seated against opposite sides of said flange seat and sealed off thereby, closure means for the other end of one screen and the adjacent pipe end, a spider having a seat for the free end of the other screen and providing a filtrate out therefor, the open end of said pipe being secured to the center of said spider, and that portion of said pipe between said flange seat and said closure means having openings therein of gradually increasing size towards the closed end of the pipe, said pipe being imperforate inside the screen having the spider outlet.

7. In a filter screen assembly, a tubular filter screen, a closure at one end of said screen, a pipe extending through said closure inside said screen, closure means at the other end of the screen also closing the adjacent end of said pipe, said pipe having openings therein gradually increasing in size toward the closed end of the pipe, the upper portion of said pipe outside said closure being imperforate, and a tubular filter screen in alignment with the first said screen around the imperforate part of said pipe, and apertured means engaging the upper end of the second said screen and said pipe and providing a filtrate outlet for the last said screen.

References Cited in the file of this patent

UNITED STATES PATENTS

| | | |
|---|---|---|
| 619,569 | Hewel | Feb. 14, 1899 |
| 654,592 | Barr | July 31, 1900 |
| 973,965 | Parker | Oct. 25, 1910 |
| 1,011,482 | Pemberton | Dec. 12, 1911 |
| 1,510,568 | Sweetland | Oct. 7, 1924 |
| 1,670,313 | Sweetland | May 22, 1928 |
| 1,673,743 | Fulcher et al. | June 12, 1928 |
| 1,705,226 | Notz | Mar. 12, 1929 |
| 1,877,157 | Cannon | Sept. 13, 1932 |
| 1,940,316 | McKinley | Dec. 19, 1933 |
| 2,017,232 | Brown | Oct. 15, 1935 |
| 2,027,681 | Durant et al. | Jan. 14, 1936 |
| 2,168,264 | Marshall | Aug. 1, 1939 |
| 2,218,715 | MacCormack | Oct. 22, 1940 |
| 2,220,706 | Cantin | Nov. 5, 1940 |
| 2,423,172 | Booth | July 1, 1947 |
| 2,423,329 | Le Clair | July 1, 1947 |

FOREIGN PATENTS

| | | |
|---|---|---|
| 128,688 | Switzerland | Nov. 16, 1928 |
| 404,309 | Great Britain | Jan. 12, 1934 |